United States Patent [19]

Zabiak et al.

[11] 4,153,593
[45] May 8, 1979

[54] FLUORESCENT INK COMPOSITION FOR JET PRINTING

[75] Inventors: Daniel M. Zabiak, Park Ridge; Ki-Sup Hwang, Chicago, both of Ill.

[73] Assignee: A. B. Dick Company, Niles, Ill.

[21] Appl. No.: 724,385

[22] Filed: Sep. 17, 1976

Related U.S. Application Data

[63] Continuation of Ser. No. 524,778, Nov. 18, 1974, abandoned.

[51] Int. Cl.² ............................................ C08L 25/14
[52] U.S. Cl. ............................ 260/29.6 ME; 106/26; 106/22
[58] Field of Search .................. 106/21, 22, 23, 26; 252/301.2; 427/1, 7, 157; 260/29.6 ME

[56] References Cited

U.S. PATENT DOCUMENTS

| | | |
|---|---|---|
| 2,333,329 | 1/1943 | Miglarese ..................... 252/301.2 R |
| 2,681,317 | 6/1954 | Grossman ..................... 252/301.2 R |
| 3,115,417 | 12/1963 | Christensen .................. 252/301.2 R |
| 3,557,015 | 1/1971 | Alburger ............................. 106/22 |
| 3,687,887 | 8/1972 | Zabiak ......................... 260/29.6 E X |
| 3,846,141 | 11/1974 | Ostergren et al. .................... 106/22 |

FOREIGN PATENT DOCUMENTS

794601  5/1958 United Kingdom ...................... 106/22

OTHER PUBLICATIONS

IBM Technical Disclosure Bulletin, vol. 16, No. 3, Aug. 1973.
*Color Index,* 3rd Edition, vol. 4, Published by The Society of Dyers and Colorists, pp. 4247 and 4424.
*Color Index,* 3rd Edition, vol. 5, Published by The Society of Dyers and Colorists, pp. 5004 and 5015.

*Primary Examiner*—Lorenzo B. Hayes
*Assistant Examiner*—W. Thompson
*Attorney, Agent, or Firm*—McDougall, Hersh & Scott

[57] ABSTRACT

An aqueous jet printing ink composition which fluoresces under ultra violet radiation containing a water soluble fluorescent dye dissolved in the water base in an amount up to 2% by weight and a water soluble binder component dissolved in the water base in an amount to provide for a specific viscosity which does not exceed 20 centipoises and which preferably includes a fluorescent brightener alone or in combination with fluorescein or one of its salts.

8 Claims, No Drawings

FLUORESCENT INK COMPOSITION FOR JET PRINTING

This is a continuation of application Ser. No. 524,778, filed Nov. 18, 1974, now abandoned.

This invention relates to a printing ink composition suitable for use in the process and equipment for jet printing and it relates more particularly to a fluorescent jet printing ink composition which becomes super-reflective or fluorescent when the printed image is exposed to ultra violet light.

For a brief description of the jet printing process, reference may be made to the Technical Report No. 1722-1 of the Stanford University Electronics Research Laboratory, dated March 1964, and entitled "High Frequency Oscillography With Electrostatically Deflected Ink Jets". The basic imaging technique in jet printing involves the use of one or more ink jet assemblies connected to a pressurized source of ink. Each jet includes a very small orifice, usually having a diameter of the order of about 0.0024 inch, which is electromagnetically energized by magneto restriction or piezoelectric means to emit a continuous stream of uniform droplets of ink of the order of 33 to 75 kilohertz (kz). The stream of droplets is directed onto a moving surface, for example, a moving web of paper, and is controlled to form printed characters in response to video signals derived from an electronic character generator and in response to an electrostatic deflection system.

In the early work relating to jet printing, as described in the aforementioned report, use was made of various types of commercially available fountain pen inks. These were found to be generally unsuitable for use as jet printing inks because they frequently contained solid dye particles or other solid materials which operated to clog the very small orifices of the ink jet. Thus one of the criteria of a suitable jet printing ink composition is the practically complete absence of particulate matter that would filter out when the ink is filtered below 5 microns and preferably below 1 micron.

Another of the problems faced by jet printing inks is the tendency for the ink to "tip dry" when left in the ink jet over short periods of time or overnight. The dried ink deposits solids which clog the orifice and block the smooth flow of the ink composition therethrough upon resumption of the operation of the jet printer. Thus another desirable characteristic of a suitable jet printing ink is one that does not tip dry in the nozzle of the jet printer.

In one of the co-applicants' previously issued U.S. Pat. No. 3,705,043, issued Dec. 5, 1972, and entitled "Infrared Absorptive Jet Printing Ink Composition", description is made of an aqueous jet printing ink composition which contains a high infrared absorbing coloring agent capable of producing an image having infrared reflectant characteristics and which is formulated to contain a humectant to overcome the problem of "tip drying".

It is an object of this invention to produce a jet printing ink composition which emits a detectable fluorescence under ultra violet radiation; which is essentially free of particulate matter as indicated by filtration with no noticeable loss in response; in which the fluorescent dye component is not dispersed thereby to avoid settling problems raised during periods of use or non-use of the ink; in which a fluorescent ink composition is formulated of a water base thereby to avoid flammability hazards and the ability to recycle with minimum loss of volatiles; in which the ink composition can be left in the printer over long periods of non-use without tip drying or clogging of the nozzle; in which the ink composition can be modified for variation in the response curve by variation in the ratios of fluorescent dyes and intensifiers, and in which a color range from white to yellow-green to red can be obtained by proper selection of fluorescent dye components.

The described objectives can be achieved, in accordance with the practice of this invention, by the formulation of a water based fluorescent jet printing ink composition containing one or more dissolved water soluble fluorescent dye components and one or more dissolved water soluble binders which do not interfere with the fluorescence of the dye component dissolved in the ink composition and which serves as a binder to enable fluorescent response upon application of the ink composition to various types of surfaces, including various types and grades of paper.

Representative of the water soluble fluorescent dye components in the fluorescent jet printing ink of this invention are fluorescein, eosin dyes, and Rhodamine dyes such as Rhodamine 7 G, Rhodamine 6 G base (C.I. Basic Red 1) and Rhodamine BX (basic Violet 10) (meta-diethyl amino phenol phthalein hydrochloride).

The concentration of the fluorescent material in the jet printing ink can be varied over fairly wide limits, depending somewhat upon the particular dye components present and the materials employed in combination therewith. In general, the fluorescence can be developed when the fluorescent dye component is present in an amount which may range from a minimum of 0.0005 to a maximum of about 2.0% by weight and preferably in an amount within the range of 0.05 to 1.0% by weight when fluorescein is employed as a dye component and 0.001 to 0.1% by weight when a Rhodamine or eosin dye component is employed as the fluorescent material.

Increase in the concentration of fluorescent dye component beyond 2% by weight of the ink composition offers no corresponding benefit. In fact, from the standpoint of fluorescence, it is undesirable to make use of an amount of fluorescent material in excess of 2% by weight since interferences in fluorescence result when present in such higher concentrations.

As the soluble binder component, use can be made of various low to medium molecular weight polymeric materials which do not interfere with the fluorescence of the fluorescent dye component in response to ultra violet radiation. Representative of such resins or high molecular weight materials which may be employed in the formulation of the ink compositions of this invention are styrene-acrylic copolymers of the type manufactured by S. C. Johnson & Company under the trade name Joncryl 60 or Joncryl 70; polymeric materials formed of styrene and maleic anhydride; polyvinyl pyrrolidones; hydroxyethyl cellulose, and hydantoin-formaldehyde resins of the type described in the Voedisch U.S. Pat. No. 3,429,825, issued on Feb. 25, 1969, and entitled "Water Soluble Daylight Fluorescent Pigment and Composition". The amount of polymeric or other high molecular weight binder component can be varied, consistent with the limitation imposed by a viscosity suitable for jet printing ink within the range of 1 to 20 and preferably 1.5 to 10 centipoises and by the conductivity of the ink, as measured by a resistivity under 1000 and preferably under 500 ohm-cm.

In the preferred practice of this invention use is made of a water soluble fluorescent brightener component in combination with the fluorescent dye material. The fluorescent brightener component operates in combination with the fluorescent dye materially to increase the amount of fluorescence made available from the same concentration of fluorescent dye or to make the same amount of fluorescence available from a lesser concentration of fluorescent dye in the jet printing ink composition. For example, fluorescein (acid yellow 73) is an excellent fluorescent material having a peak fluorescence at 527 nm, as measured by a Perkin-Elmer 204 fluorescent spectrophotometer. Fluorescein can absorb only a given amount of ultra violet light, as emitted from a standard mercury vapor light emitting at 365 nm. However, the fluorescent brightener also absorbs energy at 365 nm and re-emits the light at 460 nm. This emission is very close to the peak absorption of fluorescein so that the net effect is fluorescein acts as if it is being radiated by a light of greater flux than is actually produced.

By the addition of a fluorescent brightener, the fluorescence of the combination can be increased by as much as five times the original value. Best results are obtained when the dominant wave length of the brightener coincides with the absorption wave length of the fluorescent material employed. However, care should be exercised to avoid use of a brightener having an absorption curve which interferes with the fluorescence of the fluorescent material.

The following are representative of the fluorescent brighteners which may be used in combination with fluorescent materials in the manufacture of fluorescent jet printing inks in accordance with the practice of this invention. The brighteners are identified by their commercial designation as well as their C.I. numbers, the values given for peak fluorescence are for the peak fluorescence obtained for the combination of the brightener with fluorescein. The results were derived from a Perkin-Elmer 204 fluorescent spectrophotometer adjusted to give a relative difference in emission.

amount of fluorescence tend to be self-quenching with the result that the actual amount of fluorescence is decreased.

It has been demonstrated that if a dye, such as Rhodamine, is enhanced in its fluorescence by the combination with fluorescein alone or in combination with an optical brightener, the total lumens does not increase. However, the Rhodamine is enhanced at the expense of emission from the fluorescein. Combination with a minimum Rhodamine gave a spectrophotometer curve having a peak at 520–530 nm. When the Rhodamine is increased, the curve could actually show a double hump with peaks at 530 and 580 nm. With still more Rhodamine, the curve shows a peak at 580 nm with just a slight hump at 530 nm.

Beneficial results are secured when use is made of a fluorescent brightener in the ink compositions of this invention in an amount within the range of 0.05 to 5% by weight of the ink composition and preferably in an amount within the range of 0.1 to 2.0% by weight. When fluorescein or its soluble alkali metal salts are used as a brightener, alone or in combination with a fluorescent brightener of the type described, the quantity of fluorescein employed may range from 0.05 to 1.0% by weight of the ink composition.

The following examples are given by way of illustration, but not by way of limitation, of fluorescent jet printing ink compositions embodying the features of this invention:

EXAMPLE 1

13.4% by weight of a 15% solution in water of styrene-maleic anhydride resin (SMA17352)
5.0% by weight of a 20% solution in water of styrene-acrylic polymer (Joncryl 60)
66.1% by weight water
8.0% by weight diethylene glycol methyl ether
4.0% by weight diethylene glycol butyl ether
1.0% by weight N-methyl-2-pyrrolidone
1.0% by weight morpholine
0.75% by weight Paper White BP (brightener)

| Brightener | C.I. No. Fluorescent Brightener | Source | Peak Emission of Brightener nm | Peak Emission Combination % at 525–530nm |
|---|---|---|---|---|
| Calcofluor ABT | 158 | Cyanamid | 465 | 100 |
| Calcofluor A2RT | | Cyanamid | 440 | 40 |
| Blancophor SV | 25 | GAF | 440 | 40 |
| Tinopal GS | 47 | Geigy | 460 | 60 |
| Leucophor BSW | 30 | Sandoz | 450 | 50 |
| Paper white SP | 102 | Dupont | 440 | 40 |
| Paper white BP | 28 | Dupont | 440 | 40 |
| No Brightener | | | | 20 |

Fluorescent dye materials whose peak absorption may occur at other levels (such as near 510–550 nm) can also benefit from the additional light emission made available for the combination with such intensified fluorescent brighteners. For example, Rhodamine BX (C.I. basic violet 10) produces a relatively low fluorescence when exposed to 363 nm light. This is aided by the addition of fluorescein but more help is obtained by the combination which includes one or more brighteners with or without the added fluorescein. As previously pointed out, in accordance with the practice of this invention, it is desirable to make use of the combination of dye component and intensifier since the dyes fluoresce only in low concentration and dyes added in additional amounts with the intention of increasing the 0.75% by weight fluorescein, sodium salt The ink composition gives greenish-yellow fluorescence and is characterized by a peak of 530 nm (Perkin-Elmer) and a 10% response.

EXAMPLE 2

13.4% by weight of a 15% solution in water of styrene-maleic anhydride resin (SMA17532)
5.0% by weight of a 20% solution in water of styrene-acrylic polymer (Joncryl 60)
66.5% by weight water
8.0% by weight diethylene glycol methyl ether
4.0% by weight diethylene glycol butyl ether
1.0% by weight N-methyl-2-pyrrolidone 1.0% by weight morpholine
0.15% by weight Paper White SP solution
0.75% by weight fluorescein, sodium salt The above composition gives a Perkin-Elmer peak at 530 nm and a 26% response.

EXAMPLE 3

78.45% by weight water, filtered, deionized
2.48% by weight Calcofluor ABT solution (brightener)
4.13% by weight morpholine
14.87% by weight of a 20% solution in water of styrene-acrylic polymer (Joncryl 60)
0.07% by weight fluorescein, sodium salt The above composition gives a Perkin-Elmer peak at 530 nm and a 100% response.

EXAMPLE 4

79.710% by weight water, filtered, deionized
2.517% by weight Calcofluor ABT solution (brightener)
2.601% by weight morpholine
15.103% by weight of a 20% solution in water of styrene-acrylic polymer (Joncryl 60)
0.067% by weight fluorescein, sodium salt
0.0013% by weight Rhodamine B extra The above composition gives a Perkin-Elmer peak at 573 nm and a 58% response.

EXAMPLE 5

40.15% by weight water, filtered, deionized
2.4% by weight Calcofluor ABT solution (brightener)
2.5% by weight morpholine
49.0% by weight of a 20% solution in water of styrene-acrylic polymer (Joncryl 60)
5.4% by weight Nekal BX78 (penetrant)
0.15% by weight Surfynol 104 (defoamant, marketed by Air Reduction)
0.21% by weight fluorescein, sodium salt
0.04% by weight Rhodamine B extra
0.15% by weight ethylene glycol The above composition gives a Perkin-Elmer peak at 580 nm and an 18% response.

The ink compositions of Examples 1 and 2 give a greenish-yellow fluorescence while the ink compositions of Examples 3, 4 and 5, formulated with fluorescein, give a bright orange fluorescence.

The ink compositions of Examples 4 and 5 gain intensity at higher wave lengths and are thus more suitable for use in jet printing in a bar code configuration for scanning by electronic means for reading or for utilization in sorting operations.

The diethylene glycol methyl ether and diethylene glycol butyl ether of Examples 1 and 2 function as humectants in the manner as described in the aforementioned U.S. Pat. No. 3,705,043. As the humectant component, use can be made of aliphatic polyols, and preferably alkylene glycols in which the alkylene group preferably contains 2-6 carbon atoms, as represented by ethylene glycol, propylene glycol, butylene glycol, hexylene glycol, including the polyalkylene glycol as represented by diethylene glycol, dipropylene glycol, triethylene glycol, tripropylene glycol, tetraethylene glycol. It is possible to employ commercially available polyalkylene glycols, such as Carbowax 200 or Carbowax 400, which are polyethylene glycols having average molecular weights of about 200 and 400, respectively. In general, it is preferred, when using polyalkylene glycols, to use those materials having an average molecular weight less than 600 since higher molecular weight polyalkylene glycols frequently serve to undesirably increase the viscosity of the ink composition.

Use can also be made of the alkyl ether derivatives of the foregoing polyols as the humectant for use in the ink composition of the invention. Preferred glycol ethers are the alkyl ethers of alkylene glycols in which the alkyl group contains 1-6 carbon atoms (e.g. methyl, ethyl, propyl, butyl, etc.) and the alkylene group contains 2-6 carbon atoms. Representative of the foregoing glycol ethers are ethylene glycol methyl ether, ethylene glycol ethyl ether, ethylene glycol butyl ether, ethylene glycol hexyl ether, diethylene glycol methyl ether, diethylene glycol ethyl ether, diethylene glycol butyl ether, propylene glycol methyl ether, dipropylene glycol methyl ether, tripropylene glycol methyl ether, ethoxy triglycol (triethylene glycol ethyl ether), methoxy triglycol (triethylene) glycol methyl ether), etc. Mixtures of the foregoing glycols and glycol esters can be used and frequently are preferred.

The total amount of the humectant component employed in the composition of the invention can be varied within wide limits as dictated by the viscosity consideration of the composition as discussed above. As will be appreciated by those skilled in the art, the amount of the humectant component employed depends somewhat on the molecular weight of the glycol and/or glycol ether employed. In general, the humectant component of the invention constitutes from 2-30% by weight of the composition.

It will be understood that changes may be made in the details of formulation and operation without departing from the spirit of the invention, especially as defined in the following claims.

We claim:

1. A fluorescent jet printing ink which is reflective under ultraviolet radiation comprising a water base and the combination of a fluorescent dye component dissolved in the water base in an amount up to 2% by weight and a fluorescent brightener which absorbs at a lower energy level than the fluorescent dye component and has a peak immersion wavelength close to the peak absorption layer of the fluorescent dye component and present in the dissolved state in an amount within the range of 0.05-5% by weight, a humectant present in an amount within the range of 2-30% by weight and a water soluble binder dissolved in the water base in an amount which, when based on the viscosity of the ink composition, does not exceed 20 centipoises and provides for a specific resistivity of less than 1000 ohm-cm and which does not interfere with the fluorescence of the fluorescent dye.

2. A fluorescent printing ink composition as claimed in claim 1 in which the total fluorescent dye components are present in the ink composition in an amount within the range of 0.1% to 2% by weight.

3. A fluorescent printing ink composition as claimed in claim 1 in which the binder component is present in an amount wherein the viscosity of the ink composition is within the range of 1.5 to 10 centipoises.

4. A fluorescent printing ink composition as claimed in claim 1 in which the binder component is present in an amount wherein the specific resistivity of the ink composition is less than 500 ohm-cm.

5. A fluorescent printing ink composition as claimed in claim 1 in which the fluorescent dye is fluorescein or its water soluble salts.

6. A fluorescent ink composition as claimed in claim 1 in which the binder is a water soluble styrene-acrylate.

7. A fluorescent ink composition as claimed in claim 1 in which the humectant is selected from the group consisting of alkylene glycol and alkyl ethers of alkylene glycol, in which the alkylene group contains 2–6 carbon atoms and the alkyl group contains 1–6 carbon atoms.

8. A fluorescent ink composition as claimed in claim 1 in which the ink is filtered so that no particles greater than 5 microns are present.

* * * * *